Jan. 14, 1930.  G. VAN YAHRES  1,743,988
CUTTING TOOL
Filed April 7, 1927
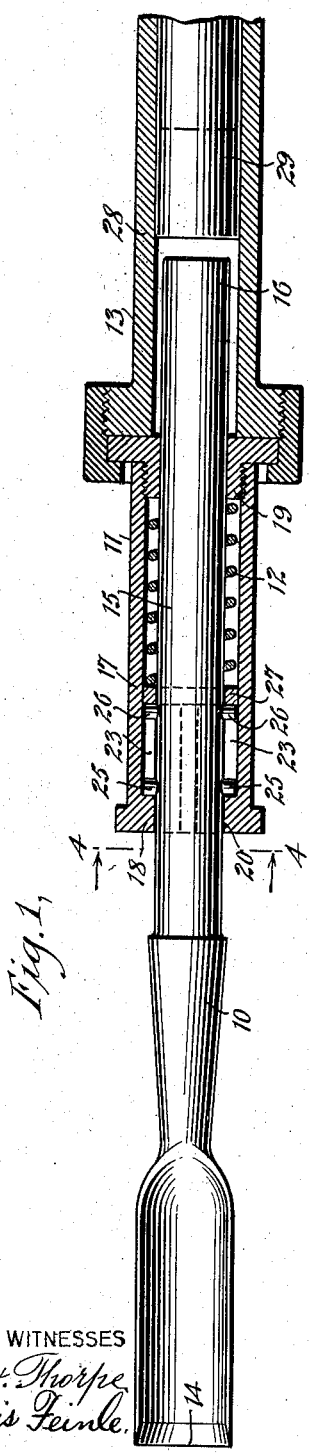
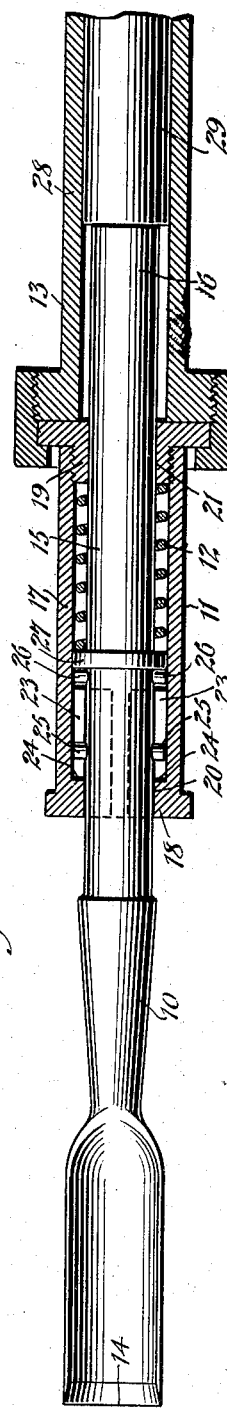
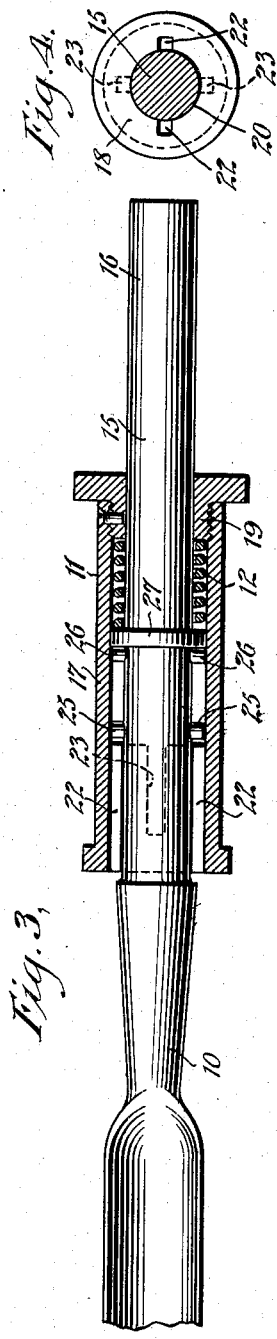
WITNESSES
Edw. Thorpe
Chris Feinle
INVENTOR
George Van Yahres
BY
ATTORNEY Patented Jan. 14, 1930

1,743,988

UNITED STATES PATENT OFFICE

GEORGE VAN YAHRES, OF WESTBURY, NEW YORK

CUTTING TOOL

Application filed April 7, 1927. Serial No. 181,788.

This invention relates to cutting tools, and has especial reference to wood cutting tools.

Some of the objects of the present invention are: to provide a cutting tool in combination with an automatic power means adapted to operate or impart impulses to the work performing implement of the tool for the cutting operation, subject to the engagement of the work performing implement with the work; to provide a tool of the indicated character with which the depth of the cut of the work performing implement or cutter is dependent upon the amount of pressure or force exerted on the implement or cutter while in operation; to provide a tool of the indicated character in which the work performing implement or cutter may be quickly and easily detached to be replaced by another, and which permits the holder of the work performing implement or cutter to be quickly and easily detached when the latter is stuck; and to provide a cutting tool which is comparatively simple in construction and reliable in operation.

The nature of the invention and its distinguishing features and advantages will appear when the following specification is read in connection with the accompanying drawing, in which Figure 1 is a sectional elevation of a tool embodying the present invention and showing the work performing implement or cutter in its normal position; the tool being connected with an automatic power device or hammer for imparting impulses to the work performing element or cutter.

Figure 2 is a view similar to Figure 1 showing the work performing element or cutter in a position to receive impulses from the power means.

Figure 3 is a view similar to Figure 1 showing the work performing implement or cutter ready to be detached from the holder or guide of the tool.

Figure 4 is a sectional view taken on the line 4—4 of Figure 1.

Generally stated, the tool of the present invention will comprise a work performing implement or cutter 10 of any preferred type, a holder or guide 11, tension means 12, and an automatic power means 13 for rapidly imparting impulses to the implement or cutter 10.

In the present instance, the work performing implement or cutter 10 is in the form of a gouge having a cutting edge 14 at one end, and a shank 15 which provides an anvil 16 at the end thereof. The holder or guide 11 includes a barrel 17 having a bushing or bearing 18 at one end. The said bushing or bearing may form a separate part of the barrel and be fixedly secured thereto, or may be formed integral with the barrel 17. The opposite end of the barrel 17 has a bushing or bearing 19 which forms a separate part of the barrel and is fixedly secured thereto. The bushings or bearings 18 and 19 provide bores 20 and 21 respectively, which are in axial alignment and accommodate the shank 15 of the implement or cutter 10.

In order to mount the work performing implement or cutter 10 for reciprocation, also to prevent the same from having turning movement, and so that the implement or cutter may be quickly and easily associated with the holder or guide 11 and be quickly and easily detached, there is provided a means presently to be described. The bushing or bearing 18 has a pair of grooves 22 which are arranged diametrically opposite each other on the inside of the bushing or bearing 18, and each of which opens through each end of the bushing or bearing 18, as shown most clearly in Figure 3. There is also provided a pair of grooves or keyways 23, which are arranged diametrically opposite each other on the inside of the bushing or bearing 18. The grooves or keyways 23 are disposed in a plane substantially at a right angle to the plane of the grooves 22. Each of the keyways 23 is closed at one end to provide a shoulder 24 and opens through the inner end of the bearing 18, as shown most clearly in Figure 2. The shank 15 of the cutter 10 is provided with keys or the like 25, disposed diametrically opposite each other, and keys or the like 26 also disposed diametrically opposite each other. The keys 26 are spaced a suitable distance from the keys 25 in the length of the shank 15. The keys 25 and 26 are in longitudinal alignment. It will now be understood that the shank 15 of the cutter 10 may be inserted in the bearings 18 and 19 by bringing the keys 25 and 26 in registration with the grooves 22. When the keys 25 have passed out of the inner ends of the grooves 22, the shank 15 may be turned one quarter of a revolution to bring the keys 25 and 26 into registration with the keyways 23. The keys 25 and 26 may then be entered into the keyways 23, as shown most clearly in Figure 1. The cutter 10 is thus allowed to have reciprocating movement, and is prevented from turning while the keys 25 are in the keyways 23.

The tensioning means 12 serves for yieldingly holding or positioning the work performing implement or cutter normally forward. The said means 12 is in the form of an expansion coil spring surrounding the shank 15 and arranged in the barrel 17, with one end thereof in contact with the bushing or bearing 19 and the opposite end thereof in contact with a washer or the like 27 which is loose on the shank 15. The said washer 27 is engaged by the keys 26 when the cutting edge 14 is in contact with the work to compress the spring 12 to increase the pressure or tension on the cutter 10.

The automatic power means 13 for imparting impulses to the cutter 10 may be of any preferred type, such as a pneumatic hammer, the effective end of which is designated 28 and which essentially includes a reciprocating impulse element or hammer 29. The pneumatic hammer 28 is operatively connected with the holder or guide 11 in any preferred manner so as to maintain the alignment of the hammer 29 with the anvil 16 of the shank 15. The anvil 16 will be spaced from the hammer 29 when the cutter 10 is in its normal position. The cutter 10 will be operated by the hammer 29 subject to the engagement of the cutting edge 14 with the work. It will therefore be understood that the pneumatic hammer 28 may be kept constantly in operation while the cutter 10 remains inactive.

The tool of the present invention is designed for carrying out cutting operations on tree trunks and branches, for trimming out decayed portions to form cavities which are filled to remedy the decayed portions of the trees. In order to cause the reciprocation of the cutter 10, it is only necessary to bring the cutting edge 14 in contact with the work with the holder or guide 11 in one hand. This brings the anvil 16 against the hammer 29 which operates to rapidly impart impulses to the anvil. The spring 12 functions to set up a reaction to the action of the hammer 29 to make it possible for the cutter 10 to be rapidly reciprocated. It is also to be understood that the greater the pressure or force which is applied to the cutter 10, the greater will be the depth of the cut made by the cutter, because the stroke of the cutter is dependent upon the disposition of the holder or guide 11 with respect to the shank 15.

It will be obvious that to separate the cutter from the holder it is only necessary to move the cutter longitudinally until the keys 25 and 26 are out of the keyways 23, whereupon the cutter may be turned until the keys are in registration with the grooves 22. The cutter 10 may be then slid longitudinally until the keys 25 and 26 pass out of the grooves 22. It should also be obvious that if the cutter 10 is stuck, the holder or guide 11 may be separated by moving the same relatively to the shank of the cutter to disengage the keys 25 and 26.

I claim:

1. A tool comprising a work implement, a handle-guide having bushings to support the work implement for reciprocation, one of said bushings having a slot extending longitudinally thereof and opening through opposite ends of the bushing, said bushing also having a keyway extending longitudinally thereof and opening through one end of said bushing, a key on said work implement adapted to pass through the slot and into the keyway for the purpose of associating the work implement with the handle-guide or for separating the same therefrom, said key when disposed in said keyway serving to prevent the work implement from turning and allowing it to reciprocate, and yieldable means having a normal tendency to urge the work implement and handle-guide relatively in opposite directions.

2. A tool comprising a work implement, a handle-guide having bushings to support the work implement for reciprocation, one of said bushings having slots extending longitudinally thereof and opening through opposite ends of the bushing, said bushing also having keyways extending longitudinally thereof and opening through one end of said bushing, keys on said work implement adapted to pass through the slots and into the keyways for the purpose of associating the work implement with the handle-guide or for separating the same therefrom, said keys when disposed in said keyways serving to prevent the work implement from turning and allowing it to reciprocate, and yieldable means acting on a pair of said keys and a portion of said handle guide and having a normal tendency to urge the work implement and handle guide relatively in opposite directions.

GEORGE VAN YAHRES.